United States Patent
Hsu

[11] Patent Number: 5,927,058
[45] Date of Patent: Jul. 27, 1999

[54] RAKE HAVING A GRIPPING MECHANISM

[76] Inventor: Shih Hao Hsu, No. 426, Dou Yuan East Road, Bi Tou Hsiang, Chang Hua Hsien, 523, Taiwan

[21] Appl. No.: 09/115,335

[22] Filed: Jul. 14, 1998

[51] Int. Cl.$^6$ .................................................. A01D 7/00
[52] U.S. Cl. .................................. 56/400.16; 56/400.19; 56/400.17
[58] Field of Search ............................ 56/400.11, 400.12, 56/400.16, 400.17, 400.18, 400.19, 400.2; 294/50.6, 50.8, 50.9, 19.1; 15/263, 199.2

[56] References Cited

U.S. PATENT DOCUMENTS 2,902,815  9/1959  Gallo, Sr. .............................. 56/400.19
5,414,982  5/1995  Darnell ................................. 56/400.19
5,440,868  8/1995  Darnell ............................ 56/400.19 X

*Primary Examiner*—Thomas B. Will
*Assistant Examiner*—Robert Pezzuto

[57] ABSTRACT

A rake includes a sleeve, a rod rotatably engaged in the sleeve, two tine heads secured to the sleeve and the rod for allowing the tine heads to be rotated relative to each other. A ratchet device may drive the rod relative to the sleeve unidirectionally such that the tine heads may be rotated toward each other by the ratchet device in order to grasp the tree leaves to be cleaned. A spring may bias the tine heads away from each other to an open or working position. A pole and a hand grip are secured to the rod for rotating the rod and thus for rotating the tine heads toward each other.

7 Claims, 6 Drawing Sheets

RAKE HAVING A GRIPPING MECHANISM

BACKGROUND OF THE INVENTION

1. Field of the Invention

The present invention relates to a rake, and more particularly to a rake having a gripping mechanism.

2. Description of the Prior Art

Typical rakes comprise a tine head that may not be used for gripping the tree leaves or the like. The user have to grasp the tree leaves after disposing the rake.

The present invention has arisen to mitigate and/or obviate the afore-described disadvantages of the conventional rakes.

SUMMARY OF THE INVENTION

The primary objective of the present invention is to provide a rake having a gripping mechanism for allowing the rake to easily grasp and hold the tree leaves or the like.

In accordance with one aspect of the invention, there is provided a rake comprising a sleeve, a first tine head secured on the sleeve, a second tine head rotatably secured on the sleeve and rotatable from an open position to a folded position, and means for rotating the second tine head toward the first tine head at the folded position.

A rod is rotatably engaged in the sleeve, the second tine head is secured to the rod and rotated in concert with the rod, the rotating means is provided for rotating the rod relative to the sleeve.

A spring biasing means is further provided for biasing the second tine head to the open position.

A ratchet means is further provided for unidirectionally driving the rod relative to the sleeve. The ratchet means includes a pole secured to the rod, a tube secured to the sleeve, a barrel secured to the tube and having a first ratchet gear, and a hand grip secured to the pole and having a second ratchet gear for engaging with the first ratchet gear, the rod and the pole are rotated unidirectionally by the hand grip via the first and the second ratchet gears to rotate the second tine head toward the first tine head. The rod includes a third ratchet gear, the pole includes a fourth ratchet gear, and the ratchet means includes a means for biasing the fourth ratchet gear of the pole to engage with the third ratchet gear of the rod. The tube includes an annular swelling extended radially inward, the pole includes at least one projection, the biasing means includes a spring engaged with the annular swelling of the tube and the at least one projection of the pole for biasing the fourth ratchet gear of the pole to engage with the third ratchet gear of the rod.

The first tine head and the second tine head each includes a primary portion and an auxiliary portion for facilitating a gripping effect of the rake.

A securing means is further provided for securing the tube to the sleeve.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
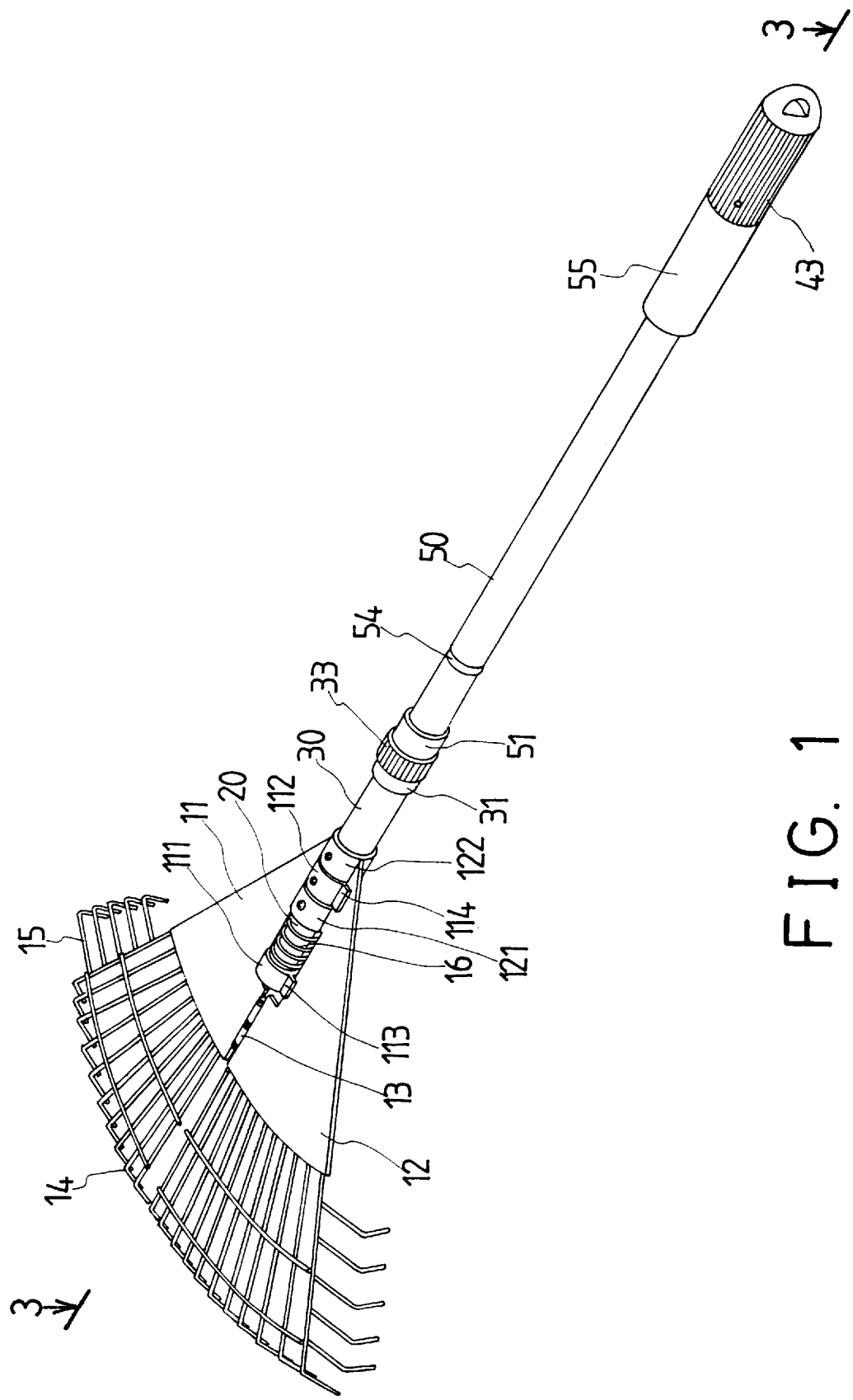
FIG. 1 is a perspective view of a rake in accordance with the present invention.
Figure 2:
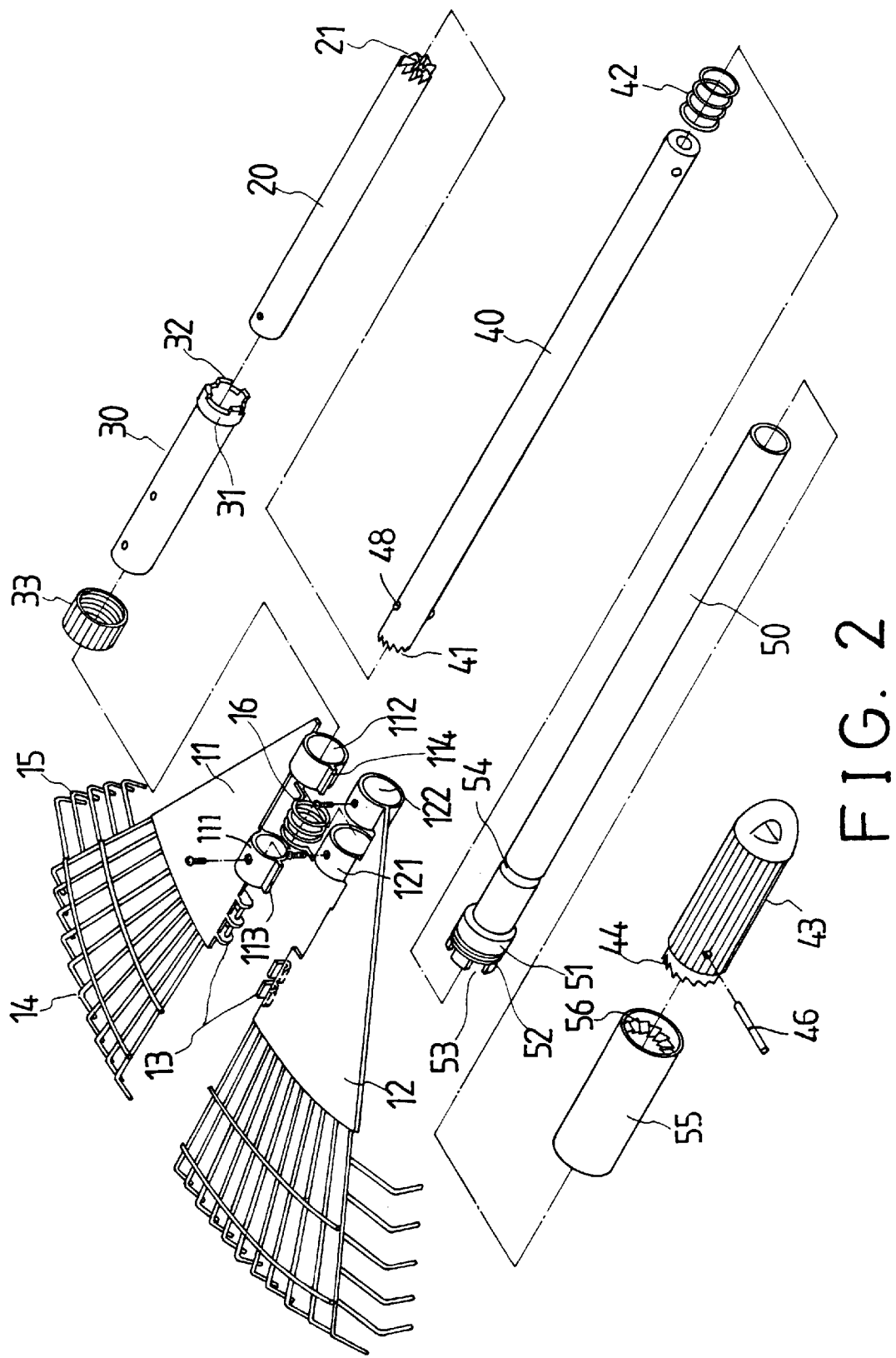
FIG. 2 is an exploded view of the rake.
Figure 3:
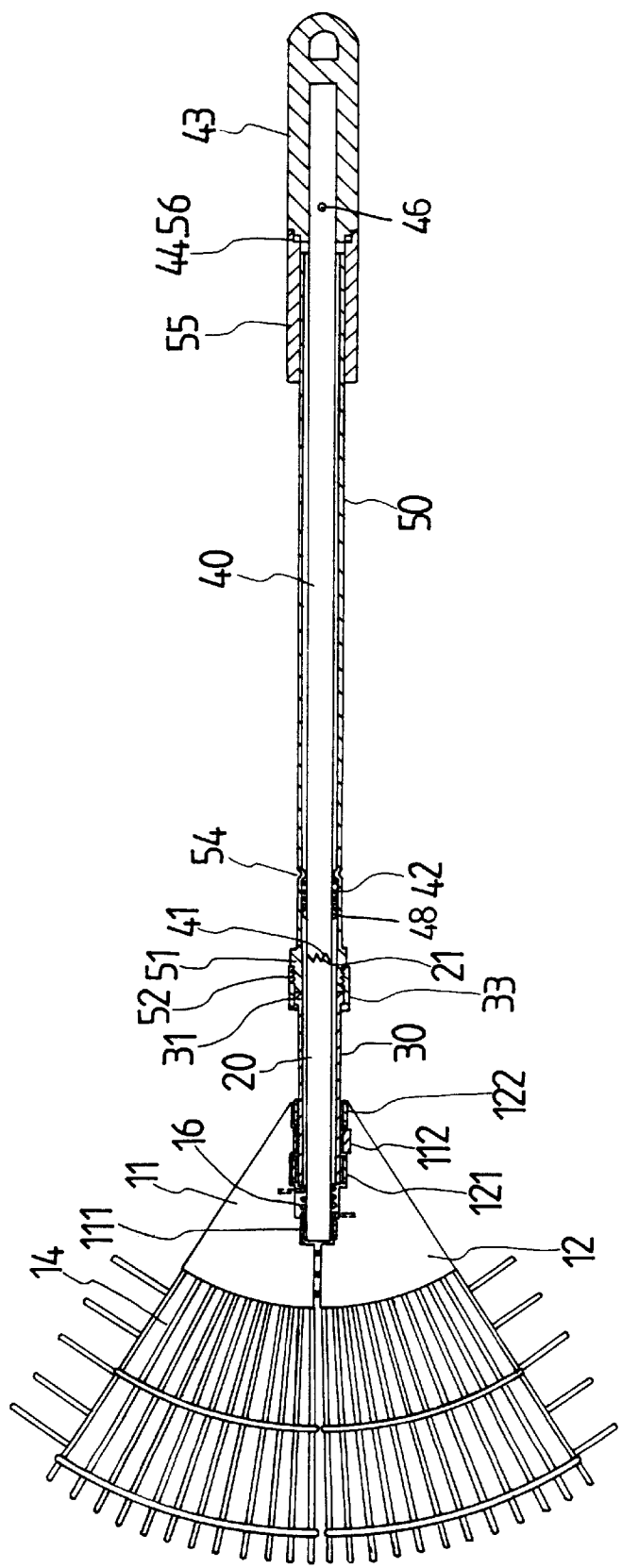
FIG. 3 is a cross sectional view taken along lines 3—3 of FIG. 1.
Figure 6:
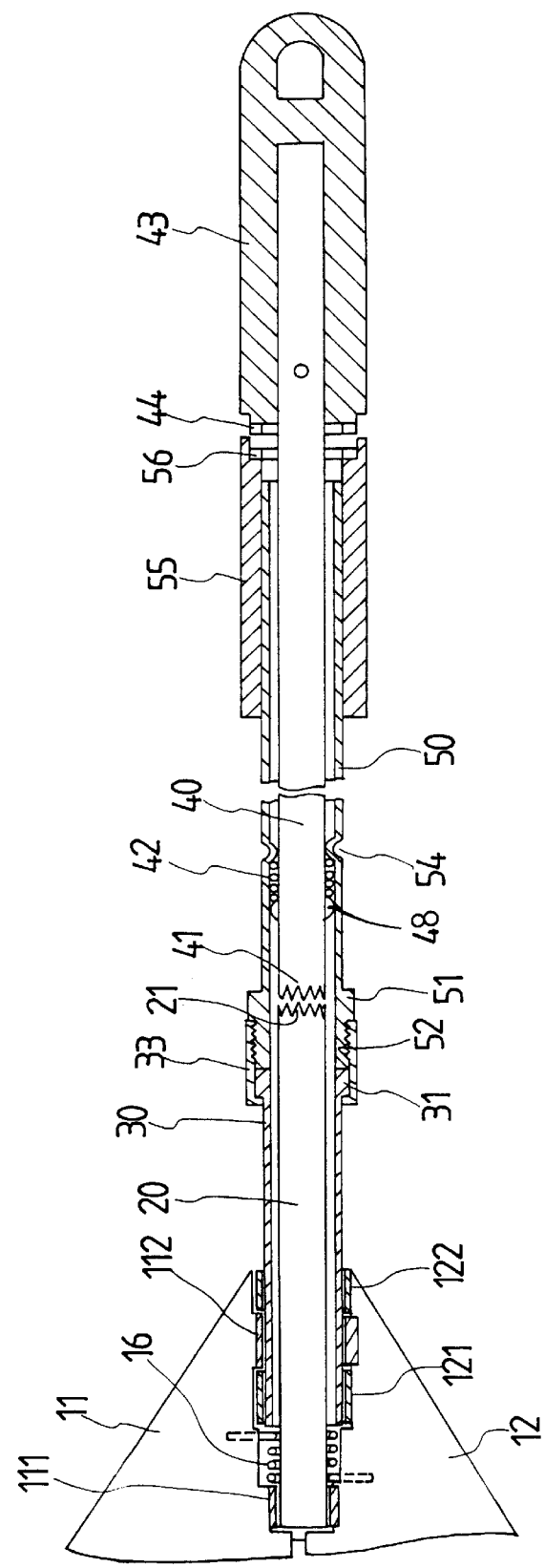
FIG. 6 is a cross sectional view similar to FIG. 3. illustrating the operation of the rake.

Referring to the drawings, and initially to FIGS. 1–3, a rake in accordance with the present invention comprises a rod 20 rotatably engaged in a sleeve 30. The rod 20 includes a ratchet gear 21 formed in the rear end. The sleeve 30 includes an annular flange 31 and a number of teeth 32 formed on the rear end. The front portion of the rod 20 is slightly extended outward of the sleeve 30 (FIGS. 1, 3). A tube 50 has an annular flange 51 and an outer thread 52 formed on the front end and includes a number of teeth or notches 53 formed in the front end for receiving the teeth 32 of the sleeve 30. A ferrule 33 is engaged with the annular flanges 32, 51 and threadedly engaged with the outer thread 52 for solidly securing the tube 50 and the sleeve 30 together. The tube 50 includes an annular swelling 54 extended radially inward (FIGS. 3, 6).

Figure 5:
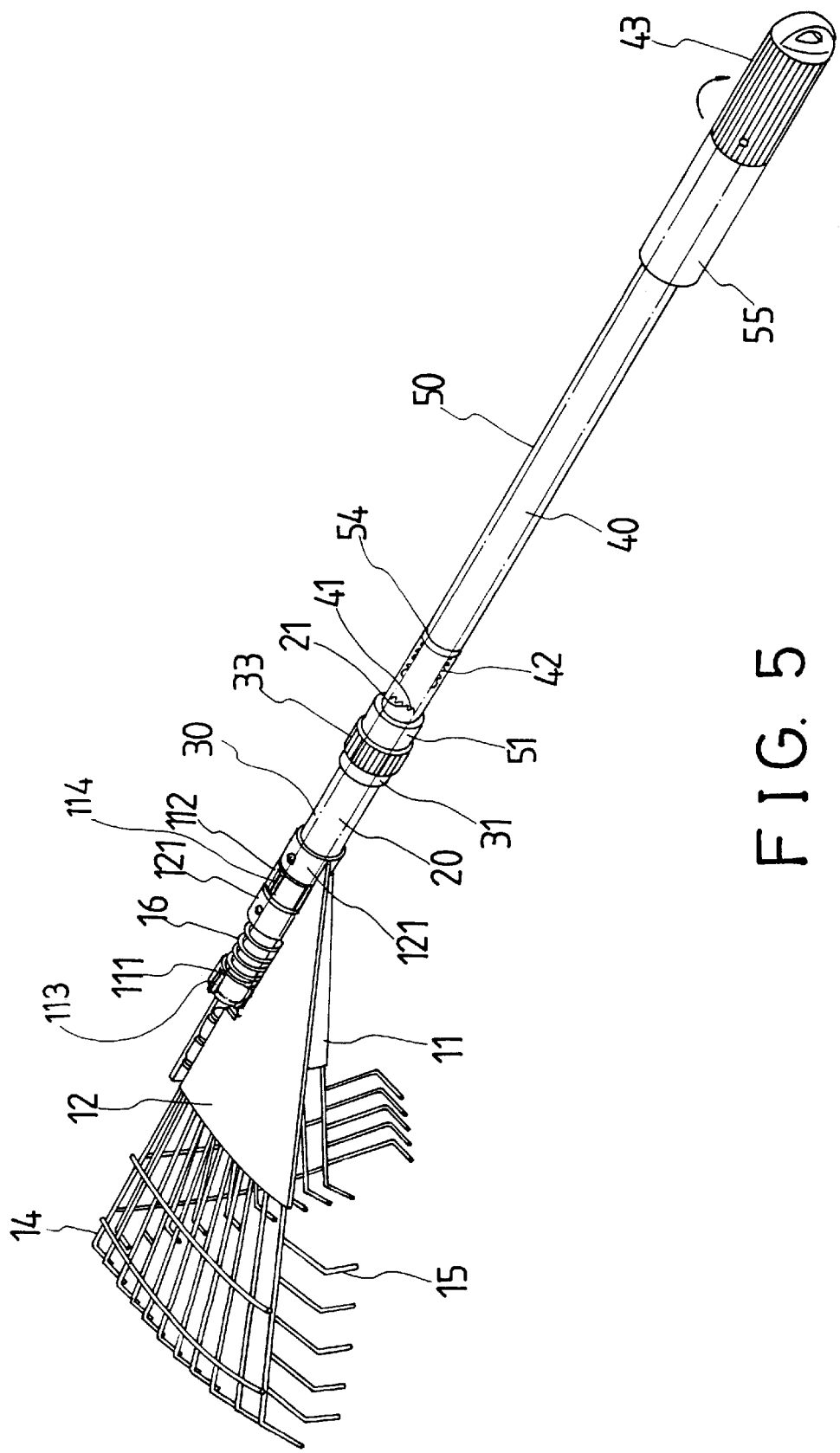
FIG. 5 is a perspective view illustrating the folding operation of the rake.

A tine head 12 has two collars 121, 122 engaged on and secured to the sleeve 30 by fasteners such that the tine head 12 rotates in concert with the sleeve 30. Another tine head 11 has a collar 112 rotatably engaged on the sleeve 30 and engaged between the collars 121, 122 and includes the other collar 111 secured on the front end of the rod 20 by fasteners, such that the tine head 11 may be rotated by the rod 20 about the sleeve 30 toward the other tine head 12 at a folded position (FIG. 5). A spring 16 is engaged on the sleeve 30 and engaged with the tine heads 11, 12 for rotating the tine heads 11, 12 to the open position (FIGS. 1, 3). The collars 111, 112 each includes a stop 113, 114 for engaging with the tine head 12 and for maintaining the tine heads 11, 12 at the open position. An auxiliary hinge 13 is further provided for pivotally coupling the tine heads 11, 12 together. The tine heads 11, 12 each preferably includes a primary portion 14 and an auxiliary portion 15 for increasing the gripping effect of the rake.

A pole 40 is rotatably engaged in the tube 50 and includes a ratchet gear 41 for engaging with the ratchet gear 21 of the rod 20 and for allowing the pole 40 to rotate the rod 20 unidirectionally. The pole 40 includes one or more projections 48 extended outward. A spring 42 is engaged with the projections 48 and the annular swelling 54 of the tube 50 for biasing the ratchet gear 41 of the pole 40 to engage with the ratchet gear 21 of the rod 20. A barrel 55 is secured on the rear end of the tube 50 by such as fasteners, force-fitted engagement, adhesive materials or by welding process, and includes a ratchet gear 56 formed in the rear end. A hand grip 43 is secured to the rear end of the pole 40 by such as a fastening pin 46 for allowing the hand grip 43 to rotate the pole and thus to rotate the rod 20. The hand grip 43 includes a ratchet gear 44 for engaging with the ratchet gear 56 of the barrel 55.

It is to be noted that the depth of the teeth of the ratchet gears 21, 41 is greater than that of the teeth of the ratchet gears 44, 56 such that the ratchet gears 21, 41 will not be disengaged from each other when the ratchet gears 44, 56 are rotated relative to each other by the hand grip 43, and such that both the rod 20 and the pole 40 may be rotated unidirectionally by the hand grip 43 via the ratchet gears 44, 56, and such that the tine heads 11, 12 may be folded toward each other for gripping the tree leaves, for example.

Figure 4:
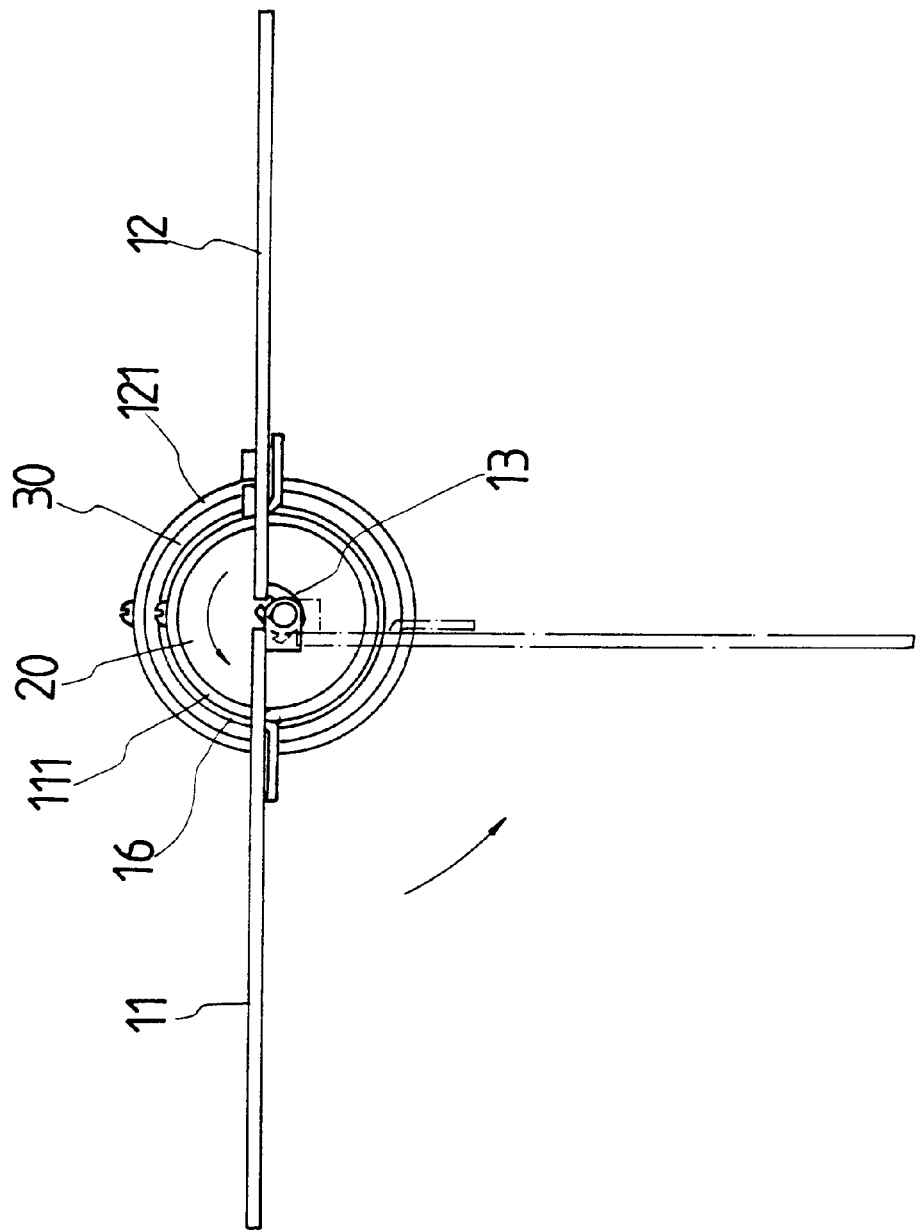
FIG. 4 is an end view illustrating the operation of the rake.

Referring next to FIGS. 4 and 6, when the hand grip 43 is pulled rearward against the spring 42, for disengaging the ratchet gears 21, 41 from each other, the spring 16 may bias the tine heads 11, 12 from the folded position (as shown in dotted lines in FIG. 4) to the open position (solid line in FIG. 4) again.

Accordingly, the rake in accordance with the present invention includes a gripping mechanism for allowing the rake to easily grasp and hold the tree leaves or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A rake comprising:

a sleeve, a first tine head secured on said sleeve, a second tine head rotatably secured on said sleeve and rotatable from an open position to a folded position, means for rotating said second tine head toward said first tine head at said folded position, and a ratchet means for unidirectionally driving said rod relative to said sleeve, said ratchet means including a pole secured to said rod, a tube secured to said sleeve, a barrel secured to said tube and having a first ratchet gear, and a hand grip secured to said pole and having a second ratchet gear for engaging with said first ratchet rear, said rod and said pole being rotated unidirectionally by said hand grip via said first and said second ratchet Rears to rotate said second tine head toward said first tine head.

2. The rake according to claim 1 further comprising a rod rotatably engaged in said sleeve, said second tine head being secured to said rod and rotated in concert with said rod, said rotating means being provided for rotating said rod relative to said sleeve.

3. The rake according to claim 1 further comprising means for biasing said second tine head to said open position.

4. The rake according to claim 1, wherein said rod includes a third ratchet gear, said pole includes a fourth ratchet gear, and said ratchet means includes a means for biasing said fourth ratchet gear of said pole to engage with said third ratchet gear of said rod.

5. The rake according to claim 1, wherein said tube includes an annular swelling extended radially inward, said pole includes at least one projection, said biasing means includes a spring engaged with said annular swelling of said tube and said at least one projection of said pole for biasing said fourth ratchet gear of said pole to engage with said third ratchet gear of said rod.

6. The rake according to claim 1, wherein said third and said fourth ratchet gears includes a depth greater than that of said first and said second ratchet gears for preventing said third and said fourth ratchet gears from being disengaged from each other when said first and said second ratchet gears rotate relative to each other.

7. The rake according to claim 1 , wherein said first tine head and said second tine head each includes a primary portion and an auxiliary portion for facilitating a gripping effect of said rake.

* * * * *